(12) United States Patent
Mackin (10) Patent No.: US 10,393,454 B2
(45) Date of Patent: Aug. 27, 2019

(54) VALVE SYSTEM

(71) Applicant: The Boeing Company, Chicago, IL (US)

(72) Inventor: Steve G. Mackin, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 109 days.

(21) Appl. No.: 15/278,083

(22) Filed: Sep. 28, 2016

(65) Prior Publication Data

US 2018/0087851 A1 Mar. 29, 2018

(51) Int. Cl.
| | | |
|---|---|---|
| *F17D 3/00* | (2006.01) | |
| *F28F 27/02* | (2006.01) | |
| *F16K 31/00* | (2006.01) | |
| *F16K 3/03* | (2006.01) | |
| *F16K 27/00* | (2006.01) | |
| *F16K 3/08* | (2006.01) | |
| *F28D 21/00* | (2006.01) | |

(52) U.S. Cl.
CPC ............... *F28F 27/02* (2013.01); *F16K 3/03* (2013.01); *F16K 3/08* (2013.01); *F16K 3/085* (2013.01); *F16K 27/003* (2013.01); *F16K 31/004* (2013.01); *F05D 2260/213* (2013.01); *F28D 2021/0021* (2013.01); *F28F 2250/08* (2013.01); *F28F 2265/10* (2013.01); *F28F 2265/30* (2013.01); *Y02T 50/675* (2013.01)

(58) Field of Classification Search
CPC .. F28F 9/026; F28F 27/00; F28F 27/02; F28F 27/003; F28F 2265/02; F16K 3/03; F16K 3/08; F16K 27/003; H01L 23/467; H02N 2/163; H02N 2/166
See application file for complete search history.

(56) References Cited

U.S. PATENT DOCUMENTS

| | | | | |
|---|---|---|---|---|
| 4,094,492 | A * | 6/1978 | Beeman | F16K 3/03 138/45 |
| 5,785,116 | A * | 7/1998 | Wagner | H01L 23/467 165/122 |
| 7,723,900 | B2 | 5/2010 | Ellesgaard et al. | |
| 2003/0008286 | A1* | 1/2003 | Zou | B01J 19/0093 435/6.12 |
| 2009/0114865 | A1* | 5/2009 | Homann | B60T 8/3675 251/129.15 |
| 2010/0007244 | A1* | 1/2010 | Fujimoto | H02N 2/163 310/323.06 |
| 2010/0065258 | A1* | 3/2010 | Blomquist | F28F 3/048 165/104.34 |
| 2010/0313584 | A1* | 12/2010 | Lopez | F24F 5/0035 62/171 |
| 2010/0314093 | A1* | 12/2010 | Refai-Ahmed | F28D 15/0266 165/287 |
| 2011/0095216 | A1* | 4/2011 | deGreef | A61G 7/05776 251/129.15 |

OTHER PUBLICATIONS

PCBMotor, "Easy to use ultrasonic piezoelectric motors," Integrating Movement & Electronics, retrieved Sep. 27, 2016, 3 pages. http://pcbmotor.com/.

* cited by examiner

*Primary Examiner* — Reinaldo Sanchez-Medina
(74) *Attorney, Agent, or Firm* — Yee & Associates, P.C.

(57) ABSTRACT

A valve system comprises a plurality of motors and a plurality of valves. The plurality of motors is formed from a printed circuit board. The plurality of valves is actuated by the plurality of motors.

19 Claims, 13 Drawing Sheets

VALVE SYSTEM

BACKGROUND INFORMATION

1. Field

The present disclosure relates generally to valves and, more specifically, to a valve system having a plurality of valves. Yet more specifically, the present disclosure includes a method for distributing flow into a heat exchanger using a valve system having a plurality of valves.

2. Background

Heat exchangers transfer energy from one fluid to another fluid. Valves may control an amount of each fluid entering a heat exchanger.

On an aircraft, a heat exchanger is used to cool engine bleed air. The heat exchanger receives engine bleed air and air from outside of the aircraft. A valve controls an amount of air entering the heat exchanger from outside of the aircraft.

In vehicles, increased weight decreases fuel efficiency of the vehicles. In spacecraft and aircraft, additional weight of the vehicle replaces potential payload such as customers, equipment, or other goods.

Conventional valves for heat exchangers may be undesirably large and heavy. Additionally, the conventional valves produce undesirable flow distortions. Therefore, it would be desirable to have a method and apparatus that take into account at least some of the issues discussed above, as well as other possible issues.

SUMMARY

In one illustrative embodiment, a valve system is presented. The valve system comprises a plurality of motors and a plurality of valves. The plurality of motors is formed from a printed circuit board. The plurality of valves is actuated by the plurality of motors.

In another illustrative embodiment, a heat exchanging system is presented. The heat exchanging system comprises a heat exchanger and a valve system. The heat exchanger has a fan inlet. The valve system is associated with the fan inlet. The valve system comprises a plurality of valves actuated by a plurality of motors. The plurality of valves is coplanar.

In yet another illustrative embodiment, a method of distributing flow into a heat exchanger is presented. At least one of a plurality of motors formed from a printed circuit board is powered. At least one valve of a plurality of valves using the at least one of the plurality of motors is actuated to modify flow into the heat exchanger.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
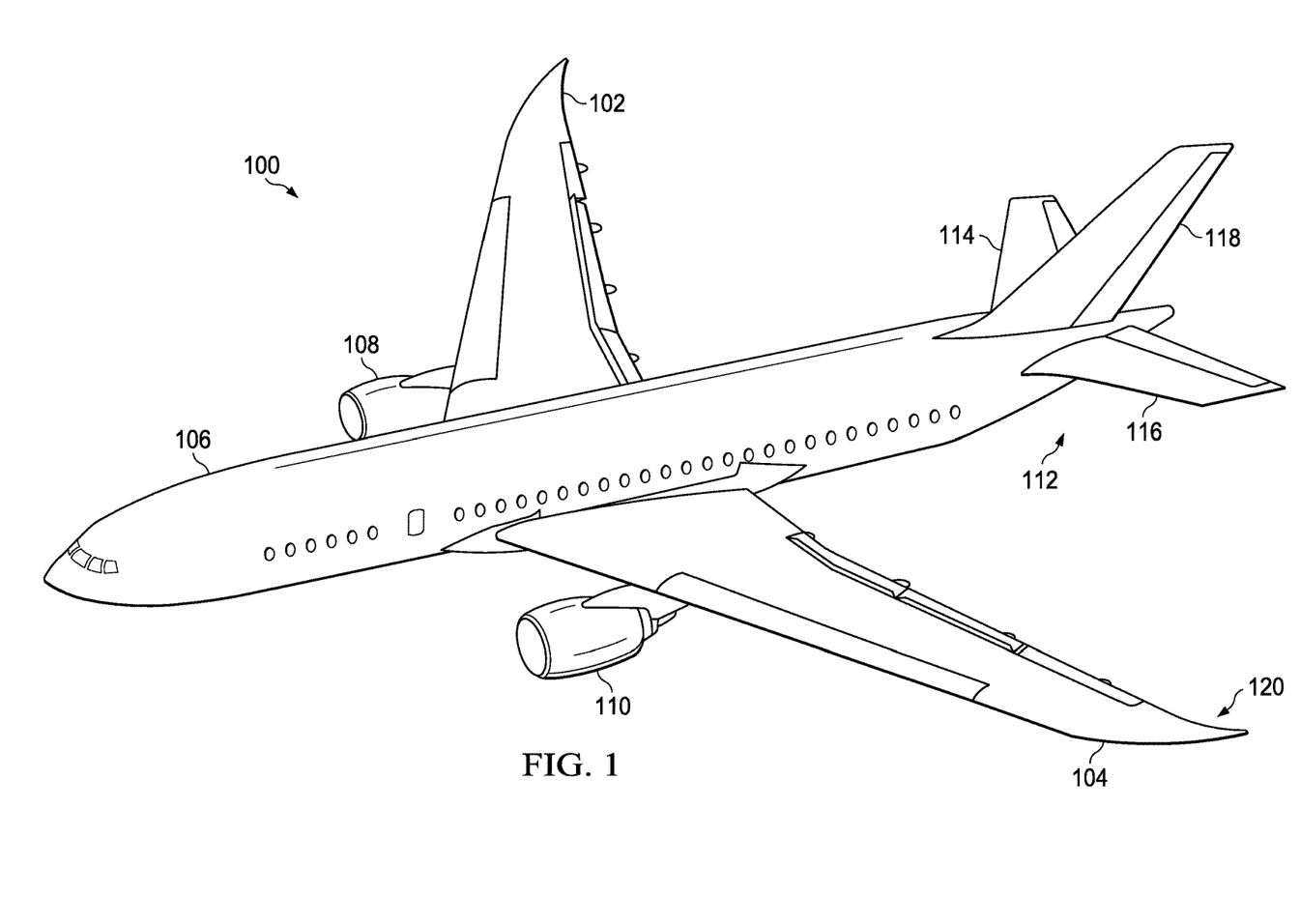
FIG. 1 is an illustration of an aircraft in which an illustrative embodiment may be implemented.

Referring now to the figures and, in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104. Body 106 has tail section 112. Horizontal stabilizer 114, horizontal stabilizer 116, and vertical stabilizer 118 are attached to tail section 112 of body 106.

Aircraft 100 is an example of an aircraft having a valve system. For example, a heat exchanger receiving bleed air from engine 108 or engine 110 may have a valve system as described.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Although the illustrative examples for an illustrative embodiment are described with respect to an aircraft, an illustrative embodiment may be applied to other types of structures. The structure may be, for example, a mobile structure, a stationary structure, a land-based structure, an aquatic-based structure, or a space-based structure. More specifically, the structure may be a surface ship, a tank, a personnel carrier, a train, a spacecraft, a space station, a satellite, a submarine, a manufacturing facility, a building, or other suitable structures.

Figure 2:
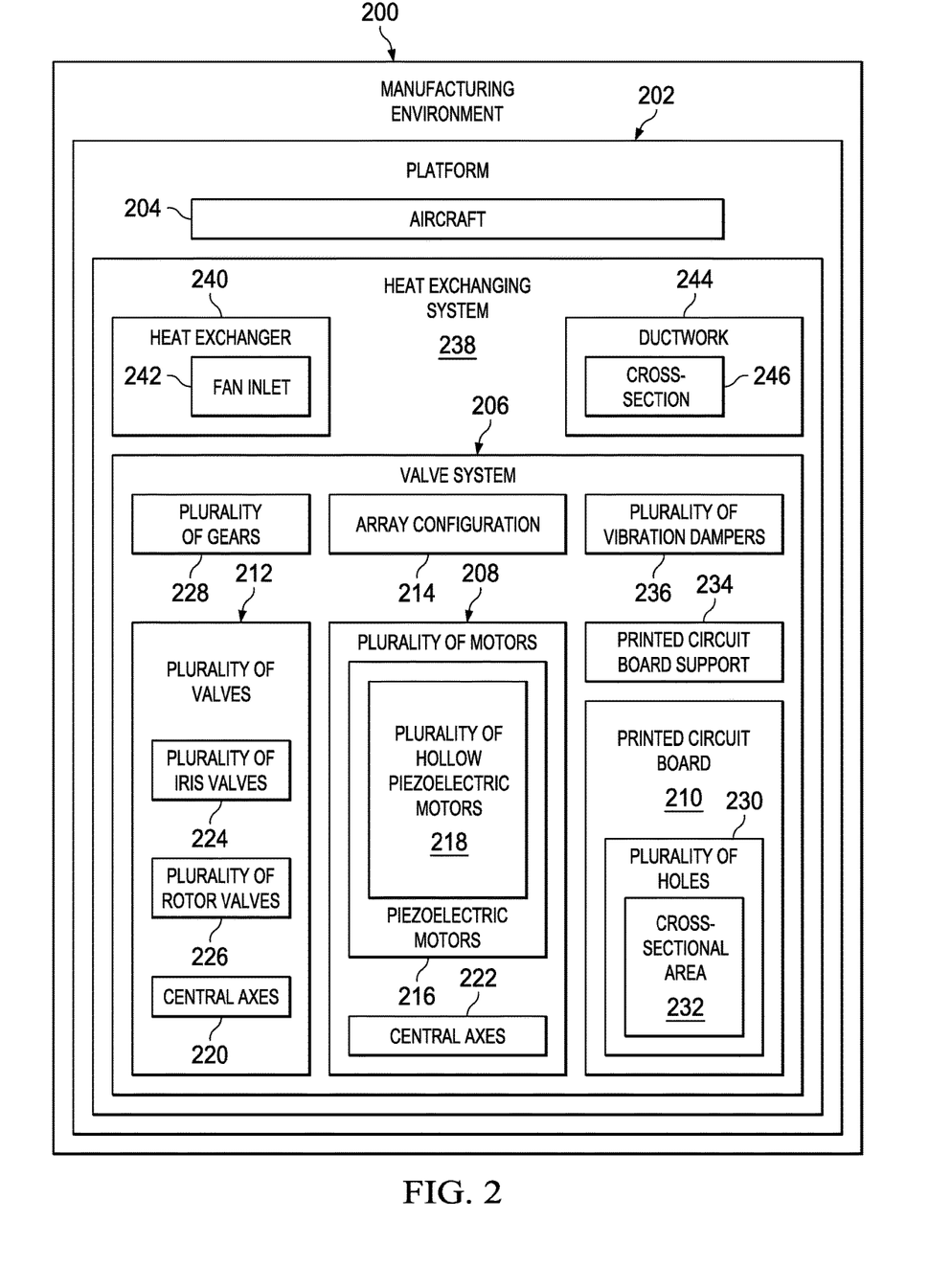
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 has platform 202. Platform 202 may take any desirable form. In some illustrative examples, platform 202 is aircraft 204. Aircraft 204 may be a representation of aircraft 100 of FIG. 1. Components of aircraft 100 may be manufactured or assembled in manufacturing environment 200.

Platform 202 includes valve system 206. Valve system 206 comprises plurality of motors 208 formed from printed circuit board 210 and plurality of valves 212 actuated by plurality of motors 208. Plurality of motors 208 is arranged in array configuration 214. Plurality of motors 208 takes the form of piezoelectric motors 216 formed from printed circuit board 210. In some examples, plurality of motors 208 is plurality of hollow piezoelectric motors 218.

Plurality of valves 212 is coplanar. Plurality of valves 212 has central axes 220. Central axes 220 are parallel to each other. Plurality of motors 208 has central axes 222. Central axes 222 are parallel to each other. In some examples, a respective central axis of each valve of plurality of valves 212 is the same as a respective central axis of a motor of plurality of motors 208. When a respective central axis of each valve of plurality of valves 212 is the same as a respective central axis of a motor of plurality of motors 208, each of plurality of valves 212 is concentric with a respective motor of plurality of motors 208.

When a respective central axis of each valve of plurality of valves 212 is the same as a respective central axis of a motor of plurality of motors 208, plurality of motors 208 takes the form of plurality of hollow piezoelectric motors 218. When a respective central axis of each valve of plurality of valves 212 is the same as a respective central axis of a motor of plurality of motors 208, fluids flowing through plurality of valves 212 also flow through plurality of hollow piezoelectric motors 218.

Plurality of valves 212 may take the form of any desirable type of valves. In some examples, plurality of valves 212 comprises a combination of multiple types of valves.

In one example, plurality of valves 212 comprises plurality of iris valves 224. In another example, plurality of valves 212 comprises plurality of rotor valves 226. In yet another example, plurality of valves 212 comprises at least one of plurality of iris valves 224 or plurality of rotor valves 226.

In some examples, valve system 206 further comprises plurality of gears 228, each connecting a respective motor of plurality of motors 208 to a respective valve of plurality of valves 212. In some illustrative examples, each motor of plurality of motors 208 is connected to only a single valve of plurality of valves 212. In other illustrative examples, each motor of plurality of motors 208 is connected to more than one valve of plurality of valves 212.

When valve system 206 includes plurality of gears 228, central axes 220 are offset from central axes 222. When valve system 206 includes plurality of gears 228, plurality of holes 230 is present in printed circuit board 210. When valve system 206 includes plurality of gears 228, fluid flowing through plurality of valves 212 flows through plurality of holes 230 in printed circuit board 210. Cross-sectional area 232 of each hole of plurality of holes 230 is at least as large as the respective opening of a valve of plurality of valves 212 associated with the hole.

In some illustrative examples, valve system 206 further includes printed circuit board support 234 and plurality of vibration dampers 236. Printed circuit board support 234 provides additional structural support to printed circuit board 210. Printed circuit board support 234 provides resistance to force applied to printed circuit board 210 in the direction of central axes 222 of plurality of motors 208.

Plurality of vibration dampers 236 reduces vibration experienced by printed circuit board 210. When valve system 206 is a component of aircraft 204, plurality of vibration dampers 236 reduces the vibrations experienced by printed circuit board 210 from operation of aircraft 204 such as take-off, landing, turbulence, and other actions.

In some illustrative examples, valve system 206 is a component of heat exchanging system 238. In these illustrative examples, heat exchanging system 238 comprises heat exchanger 240 having fan inlet 242 and valve system 206 associated with fan inlet 242, and valve system 206 comprising plurality of valves 212 actuated by plurality of motors 208. In these examples, plurality of valves 212 is coplanar.

In some examples, to insert valve system 206 into heat exchanging system 238, valve system 206 is slid onto fan inlet 242 of heat exchanger 240. Installing valve system 206 in heat exchanging system 238 may be similar to installing a conventional planar air filter in an HVAC system. In these illustrative examples, valve system 206 has a lower installation time than conventional valves.

Valve system 206 may simplify ductwork 244 in comparison to conventional valves. Ductwork 244 delivers air to fan inlet 242 of heat exchanger 240. Cross-section 246 of ductwork 244 varies to accommodate conventional valves. When valve system 206 is associated with fan inlet 242 of heat exchanger 240, cross-section 246 of ductwork 244 may be substantially the same throughout ductwork 244.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, platform 202 may take the form of any desirable platform. Additionally, valve system 206 may not be associated with heat exchanger 240. For example, valve system 206 may be associated with an air conditioning delivery vent in an automobile. In another illustrative example, valve system 206 may act as a throttle for an engine of an automobile.

Figure 3:
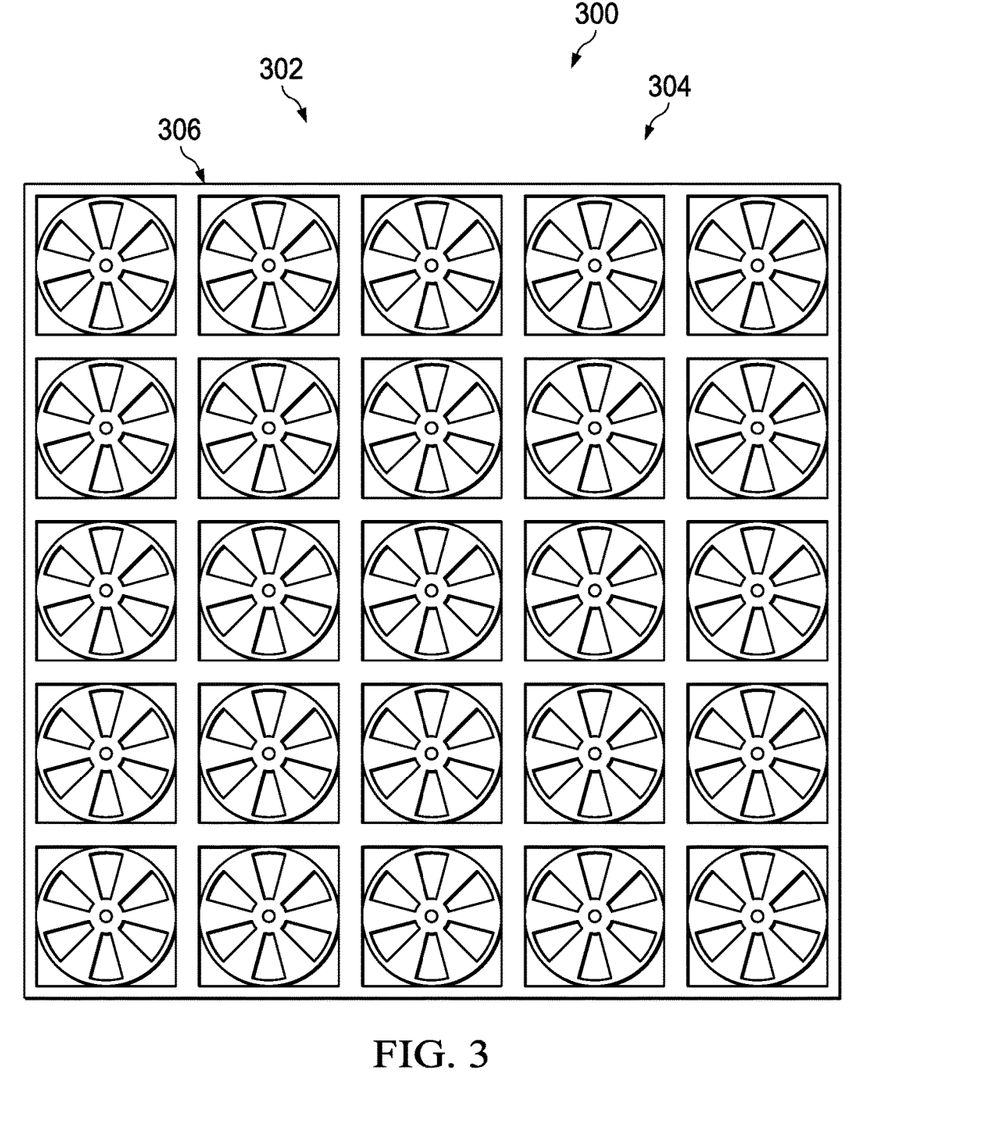
FIG. 3 is an illustration of a front view of a valve system having rotor valves in accordance with an illustrative embodiment.

Turning now to FIG. 3, an illustration of a front view of a valve system having rotor valves is depicted in accordance with an illustrative embodiment. Valve system 300 is a physical implementation of valve system 206 of FIG. 2. Valve system 300 has plurality of valves 302. As depicted, plurality of valves 302 includes twenty-five valves, however, plurality of valves 302 may include any desirable number of valves.

In this illustrative example, plurality of valves 302 takes the form of plurality of rotor valves 304. Although, as depicted, each of plurality of valves 302 is a rotor valve. In some other illustrative examples, plurality of valves 302 may include multiple types of valves.

Plurality of valves 302 is coplanar. Further, plurality of valves 302 is laid out in matrix 306. Matrix 306 has five rows of valves and five columns of valves. Matrix 306 may have any desirable number of rows or columns. Further, plurality of valves 302 may have any desirable layout or design. In some illustrative examples, plurality of valves 302 may have a design other than a matrix. The quantity of valves and the layout of the valves may be configured based on at least one of limitations of the motor size, optimum load distribution, valve area blockage at full open, pressure of fluid, desired control of flow direction, desired pressure on each of plurality of valves 302, or any other desirable design attribute.

Figure 4:
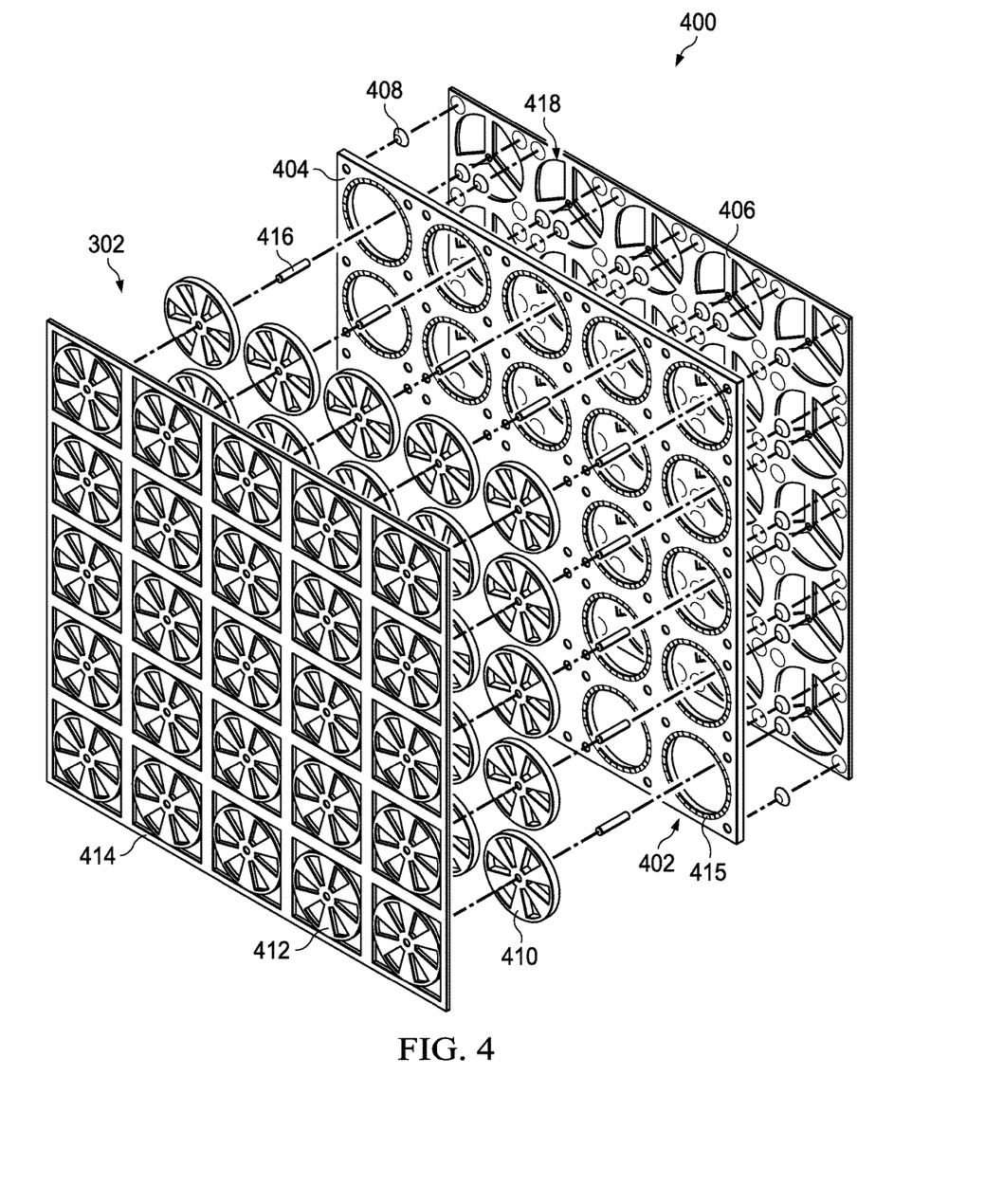
FIG. 4 is an illustration of an exploded view of a valve system having rotor valves in accordance with an illustrative embodiment.

Turning now to FIG. 4, an illustration of an exploded view of a valve system having rotor valves is depicted in accordance with an illustrative embodiment. View 400 is an exploded view of valve system 300 of FIG. 3.

Valve system 300 includes plurality of valves 302, plurality of motors 402 formed from printed circuit board 404, printed circuit board support 406, and plurality of vibration dampers 408. As depicted, plurality of valves 302 takes the form of a plurality of rotor valves. The plurality of rotor valves includes plurality of rotors 410 and plurality of stators 412 connected to structural frame 414.

As depicted, plurality of motors 402 takes the form of a plurality of hollow piezoelectric motors 415. When assembled, plurality of rotors 410 is seated within plurality of hollow piezoelectric motors 415. Plurality of rotors 410 is supported by rotor shaft 416 connected to printed circuit board support 406.

During operation, aerodynamic load is absorbed by structural frame 414 and through rotor shaft 416 to printed circuit board support 406. A load sufficient to run plurality of motors 402 is applied to printed circuit board 404.

Plurality of holes 418 is formed in printed circuit board support 406. During operation, fluid will flow through plurality of valves 302, plurality of motors 402, and plurality of holes 418.

FIG. 4 is only one illustrative example of a physical implementation of valve system 206 of FIG. 2. Components of valve system 300 may be designed based on operating parameters. For example, the size, shape, and quantity of rotors in each of plurality of valves 302 may be selected to provide desirable operation. Further, the size, shape, and location of plurality of holes 418 in printed circuit board support 406 may be selected to provide minimal loss. Plurality of motors 402 is not limited to hollow piezoelectric motors. Plurality of motors 402 may instead be linear piezoelectric motors, circular non-hollow motors, or any other desirable shape of motor. Yet further, additional vibration dampers 408 may be present between printed circuit board 404 and structural frame 414. In some examples, fewer vibration dampers 408 than depicted may be present between printed circuit board 404 and printed circuit board support 406.

Figure 5:
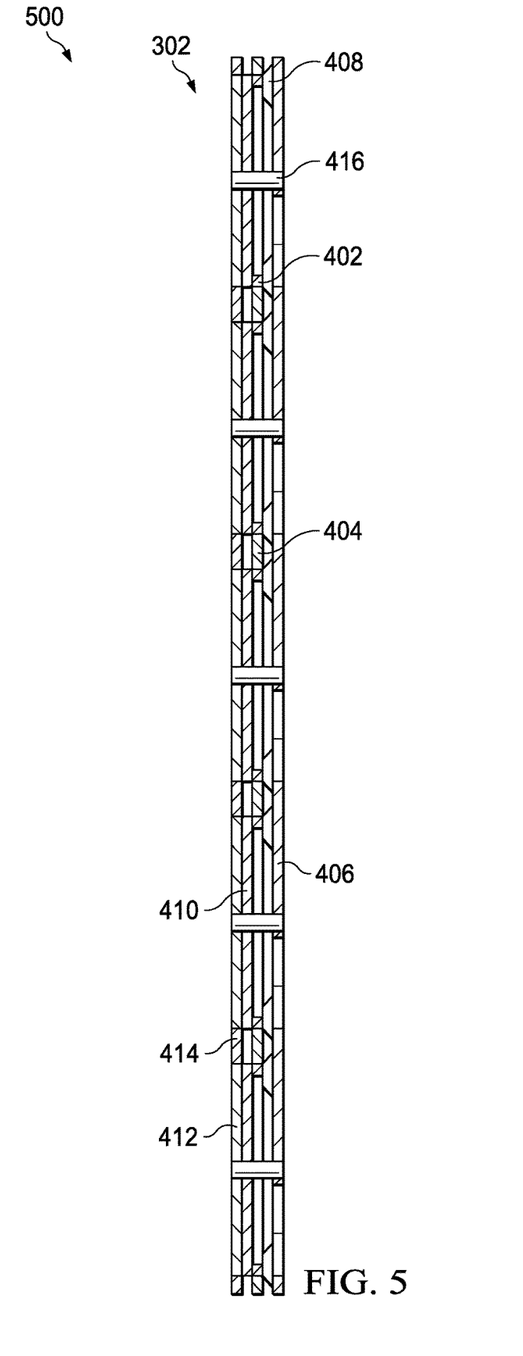
FIG. 5 is an illustration of a cross-sectional view of a valve system having rotor valves in accordance with an illustrative embodiment.

Turning now to FIG. 5, an illustration of a cross-sectional view of a valve system having rotor valves is depicted in accordance with an illustrative embodiment. View 500 is a cross-sectional view of valve system 300 of FIG. 3.

As depicted, plurality of valves 302 is concentric with plurality of motors 402. Fluid flowing through plurality of valves 302 will also flow through respective motors of plurality of motors 402.

Figure 6:
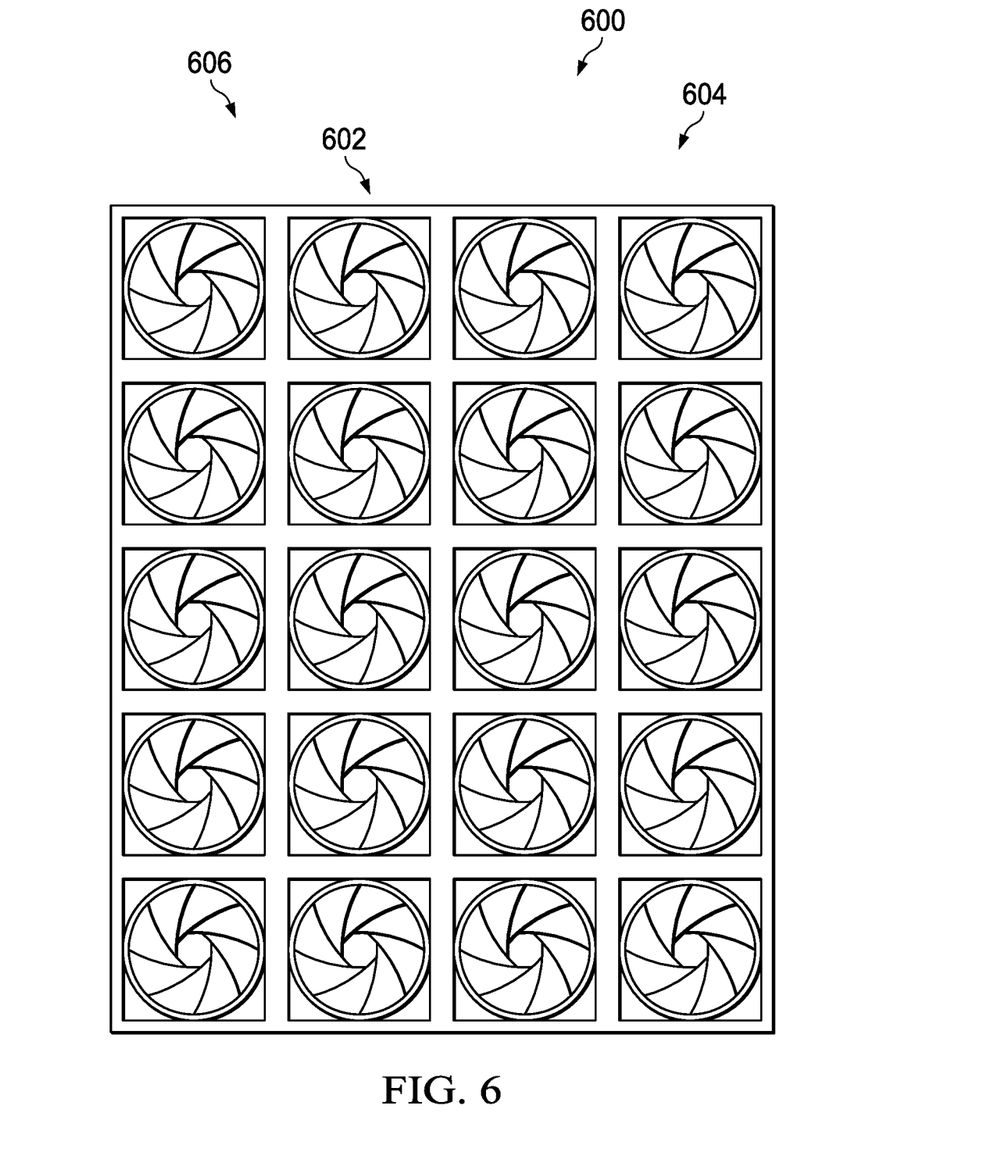
FIG. 6 is an illustration of a front view of a valve system having iris valves in accordance with an illustrative embodiment.

Turning now to FIG. 6, an illustration of a front view of a valve system having iris valves is depicted in accordance with an illustrative embodiment. Valve system 600 is a physical implementation of valve system 206 of FIG. 2. Valve system 600 has plurality of valves 602. As depicted, plurality of valves 602 includes twenty valves, however, plurality of valves 602 may include any desirable number of valves.

In this illustrative example, plurality of valves 602 takes the form of plurality of iris valves 604. Although, as depicted, each of plurality of valves 602 is an iris valve. In some other illustrative examples, plurality of valves 602 may include multiple types of valves.

Plurality of valves 602 is coplanar. Further, plurality of valves 602 is laid out in matrix 606. Matrix 606 has five rows of valves and four columns of valves. Matrix 606 may have any desirable number of rows or columns. Further, plurality of valves 602 may have any desirable layout or design. In some illustrative examples, plurality of valves 602 may have a design other than a matrix. The quantity of valves and the layout of the valves may be configured based on at least one of pressure of fluid, desired control of flow direction, desired pressure on each of plurality of valves 602, or any other desirable design attribute.

Figure 7:
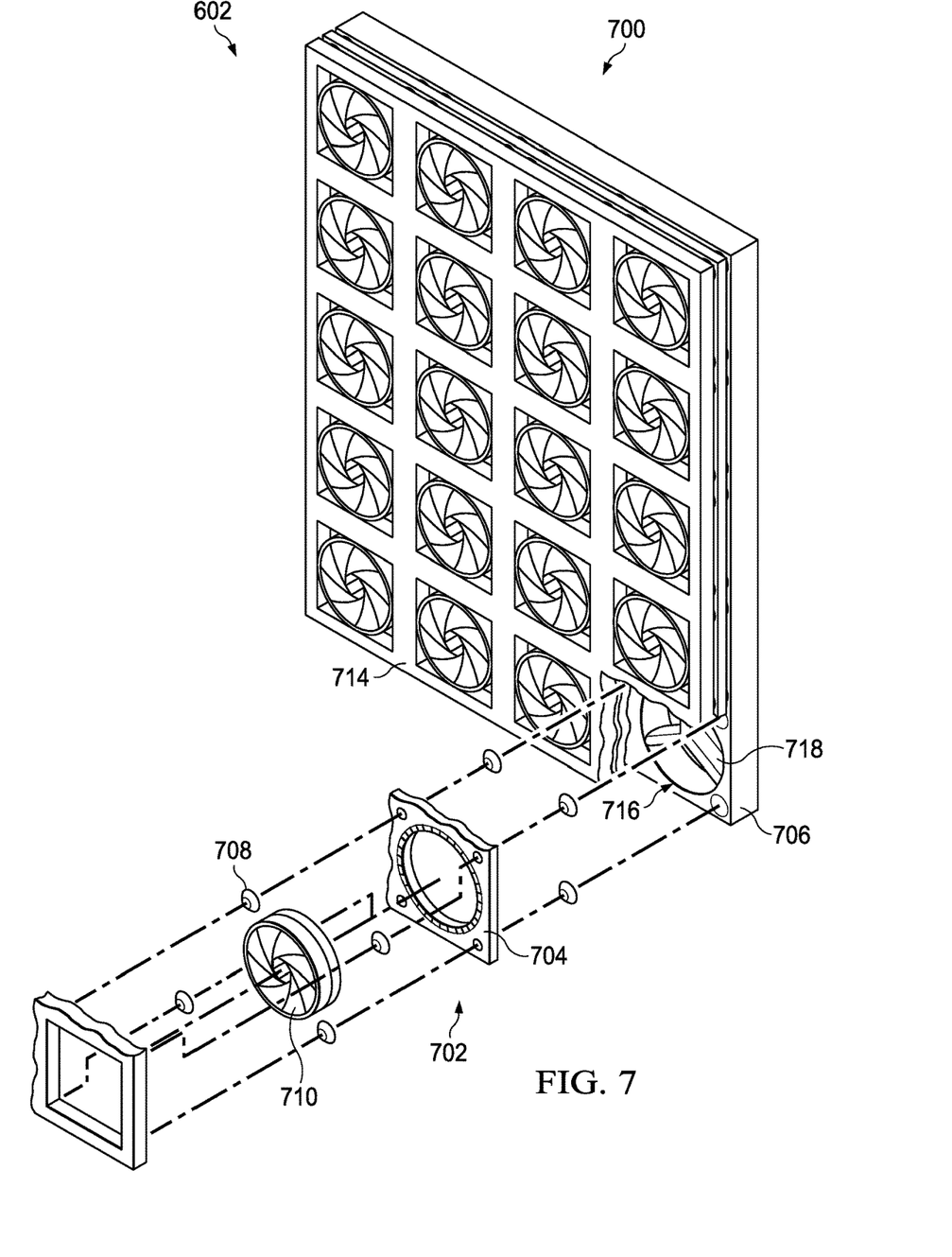
FIG. 7 is an illustration of an exploded view of a valve system having iris valves in accordance with an illustrative embodiment.

Turning now to FIG. 7, an illustration of an exploded view of a valve system having iris valves is depicted in accordance with an illustrative embodiment. More specifically, in view 700, valve assembly 702 of plurality of valves 602 of valve system 600 of FIG. 6 is exploded. The remaining valves of plurality of valves 602 remain assembled in view 700.

Valve system 600 includes plurality of valves 602, a plurality of motors formed from printed circuit board 704, printed circuit board support 706, and plurality of vibration dampers 708. As depicted, motor 709 of the plurality of motors takes the form of hollow piezoelectric motor 710. The remaining motors of the plurality of motors may also take the form of hollow piezoelectric motors.

As depicted, plurality of iris valves 604 are supported by structural frame 714. During operation, structural frame 714 and printed circuit board support 706 carry the aerodynamic load.

A plurality of holes is formed in printed circuit board support 706. During operation, fluid will flow through plurality of iris valves 604, the plurality of motors, and the plurality of holes.

Hole 716 is one hole of the plurality of holes formed in printed circuit board support 706. Hole 716 has fins 718. As depicted, fins 718 have aerodynamic shapes. The shape of fins 718 may be selected to reduce loss due to drag. As depicted, the shape of fins 718 may be similar to airfoils.

Figure 8:
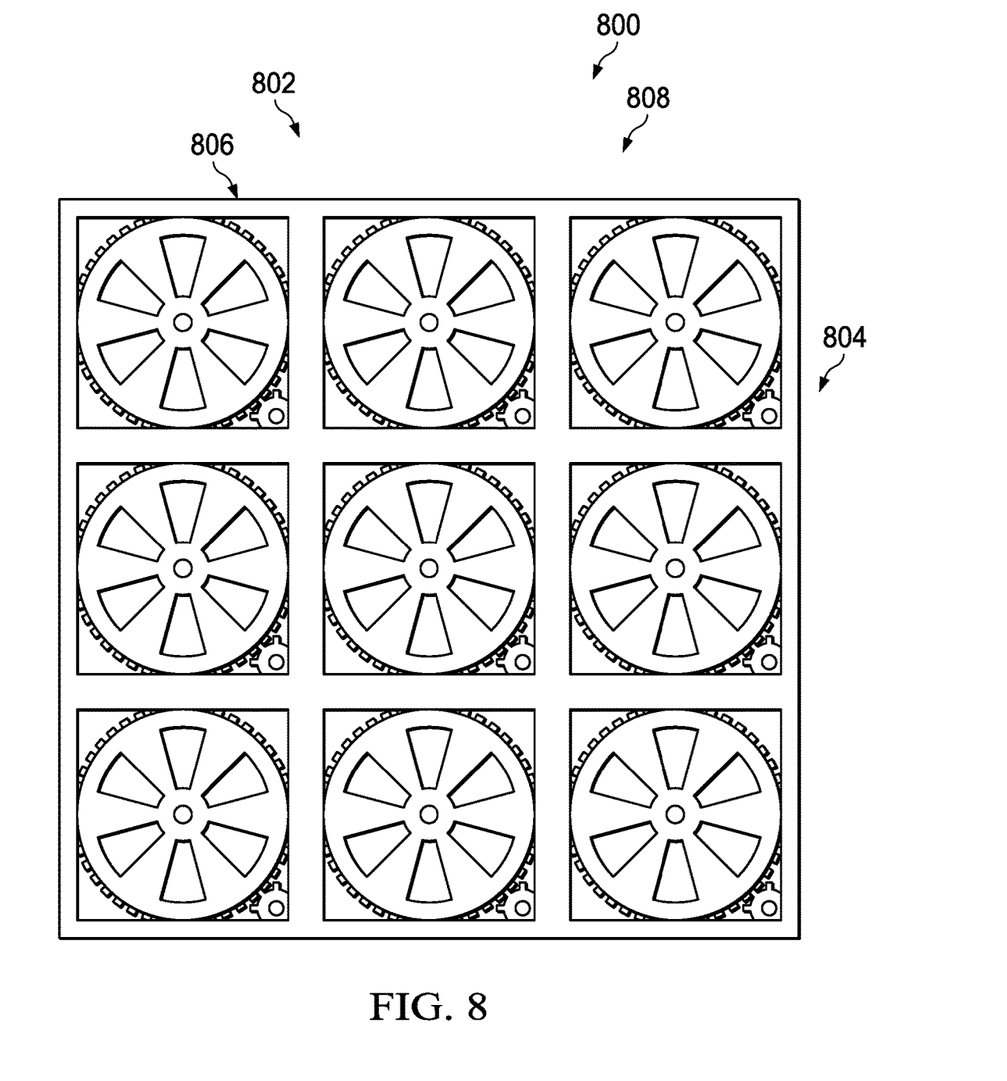
FIG. 8 is an illustration of a front view of a valve system having a plurality of gears in accordance with an illustrative embodiment.

Turning now to FIG. 8, an illustration of a front view of a valve system having a plurality of gears is depicted in accordance with an illustrative embodiment. Valve system 800 is a physical implementation of valve system 206 of FIG. 2. Valve system 800 has plurality of valves 802 and plurality of gears 804. As depicted, plurality of valves 802 includes nine valves, however, plurality of valves 802 may include any desirable number of valves.

In this illustrative example, plurality of valves 802 takes the form of plurality of rotor valves 806. Although, as depicted, each of plurality of valves 802 is a rotor valve. In some other illustrative examples, plurality of valves 802 may include multiple types of valves.

Plurality of valves 802 is coplanar. Further, plurality of valves 802 is laid out in matrix 808. Matrix 808 has three rows of valves and three columns of valves. Matrix 808 may have any desirable number of rows or columns. Further, plurality of valves 802 may have any desirable layout or design. In some illustrative examples, plurality of valves 802 may have a design other than a matrix. The quantity of valves and layout of the valves may be configured based on at least one of pressure of the fluid, desired control of flow direction, desired pressure on each of plurality of valves 802, or any other desirable design attribute.

Figure 9:
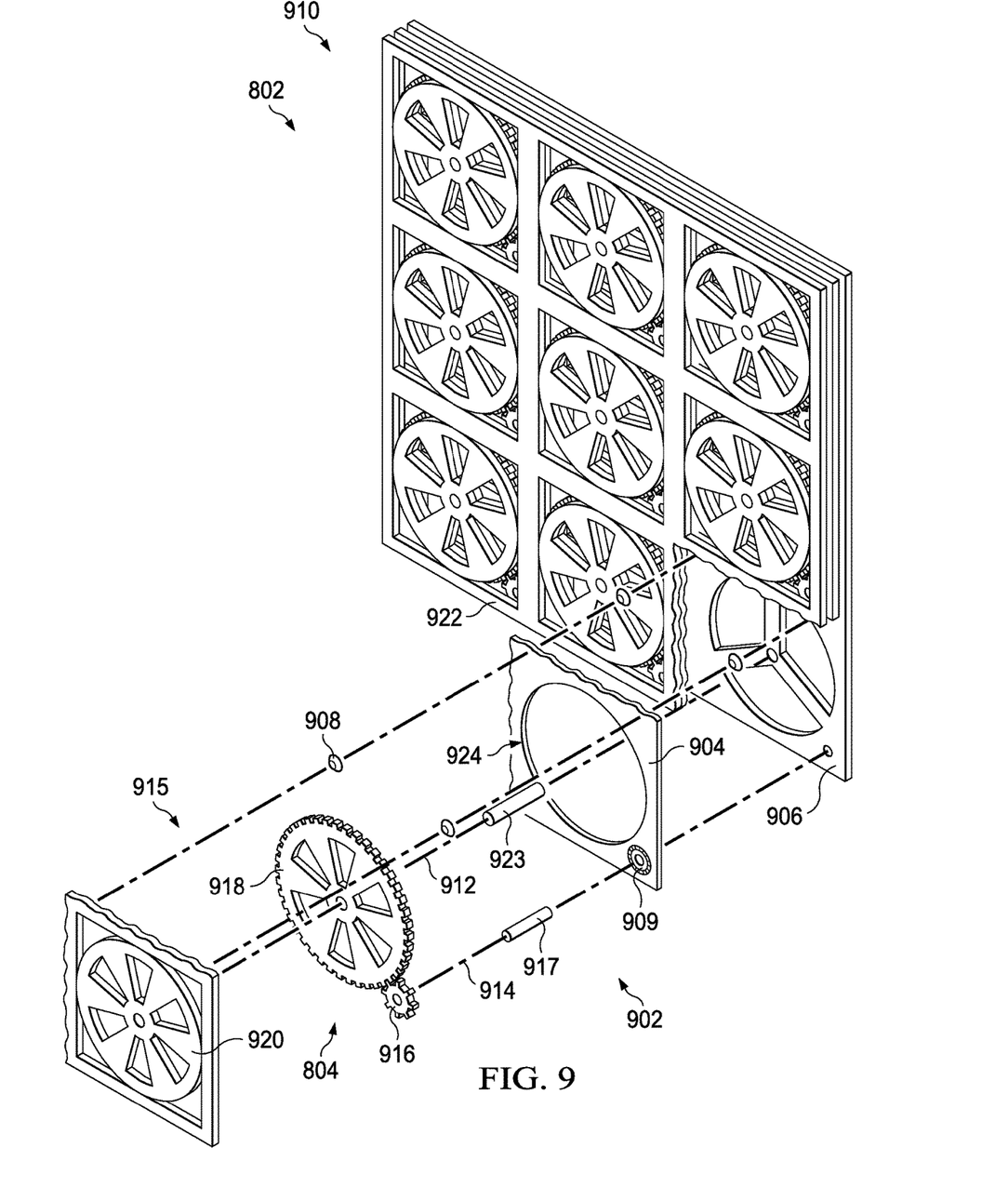
FIG. 9 is an illustration of an exploded view of a valve system having a plurality of gears in accordance with an illustrative embodiment.

Turning now to FIG. 9, an illustration of an exploded view of a valve system having a plurality of gears is depicted in accordance with an illustrative embodiment. More specifically, in view 900, valve assembly 902 of plurality of valves 802 of valve system 800 of FIG. 8 is exploded. The remaining valves of plurality of valves 802 remain assembled in view 900.

Valve system 800 includes plurality of valves 802, plurality of gears 804, a plurality of motors formed from printed circuit board 904, printed circuit board support 906, and plurality of vibration dampers 908. As depicted, motor 909 of the plurality of motors takes the form of piezoelectric motor 910. Central axis 914 of motor 909 is offset from central axis 912 of valve 915 of plurality of valves 802. Although not visible in view 900, each of the central axes of the plurality of motors are offset from central axes of plurality of valves 802.

As depicted, plurality of gears 804 connects the plurality of motors to plurality of valves 802. Plurality of gears 804 is supported by a plurality of gear shafts. As depicted, gear 916 is supported by gear shaft 917.

In some examples, each motor of the plurality of motors is connected to a single valve of plurality of valves 802. In other illustrative examples, each motor of the plurality of motors may be connected to more than one valve of plurality of valves 802.

As depicted, plurality of valves 802 takes the form of a plurality of rotor valves. Valve 915 includes rotor 918 and stator 920. Thus, plurality of valves 802 includes a plurality of rotors and plurality of stators connected to structural frame 922. Each of the plurality of rotors is supported by a rotor shaft connected to printed circuit board support 906. As depicted, rotor 918 is supported by rotor shaft 923 connected to printed circuit board support 906.

Printed circuit board 904 also has hole 924 of a plurality of holes in printed circuit board 904. Fluid flowing through plurality of valves 802 also flows through the plurality of holes. Each hole of the plurality of holes is associated with at least one valve of plurality of valves 802. The quantity, size, position, shape, and other attributes of each hole of plurality of holes are selected based on operational parameters. The operational parameters include at least one of pressure of the fluid, strength of the material of printed circuit board 904, support for printed circuit board 904, full open area, full closed area, pressure capability, temperature capability, speed of operation from full open to full closed rate, leakage, and operational requirements of the component receiving the flow.

Figure 10:
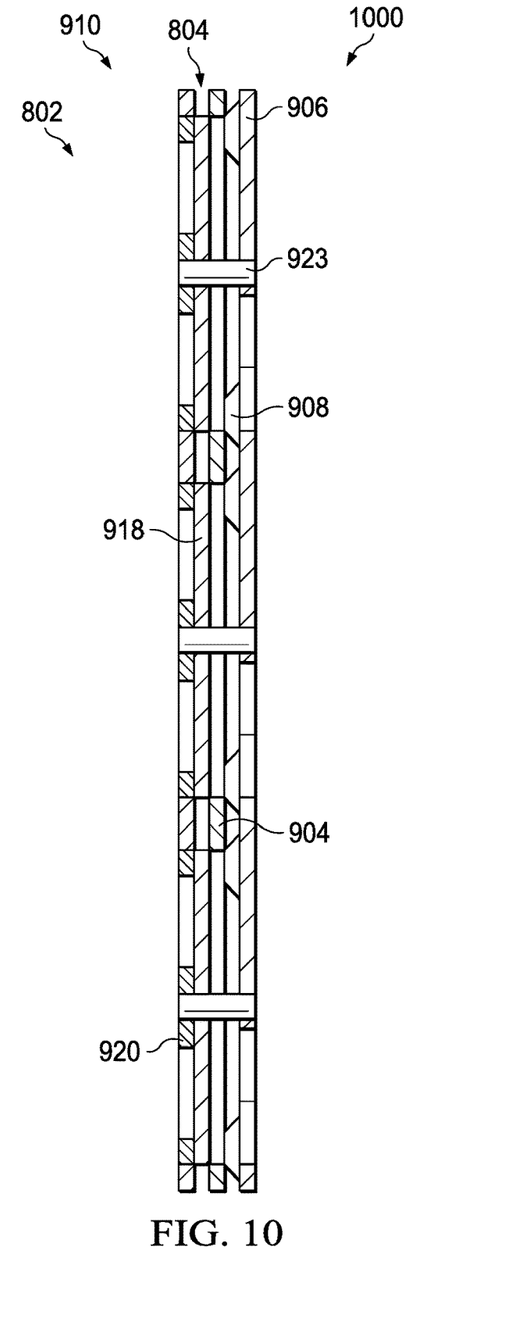
FIG. 10 is an illustration of a cross-sectional view of a valve system having a plurality of gears in accordance with an illustrative embodiment.

Turning now to FIG. 10, an illustration of a cross-sectional view of a valve system having a plurality of gears is depicted in accordance with an illustrative embodiment. View 1000 is a cross-sectional view of valve system 800 of FIG. 8.

As depicted, plurality of valves 802 are offset from the plurality of motors. Fluid flowing through plurality of valves 802 will not flow through the plurality of motors. Fluid flowing through plurality of valves 802 will also flow through respective holes of the plurality of holes in printed circuit board 904.

Figure 11:
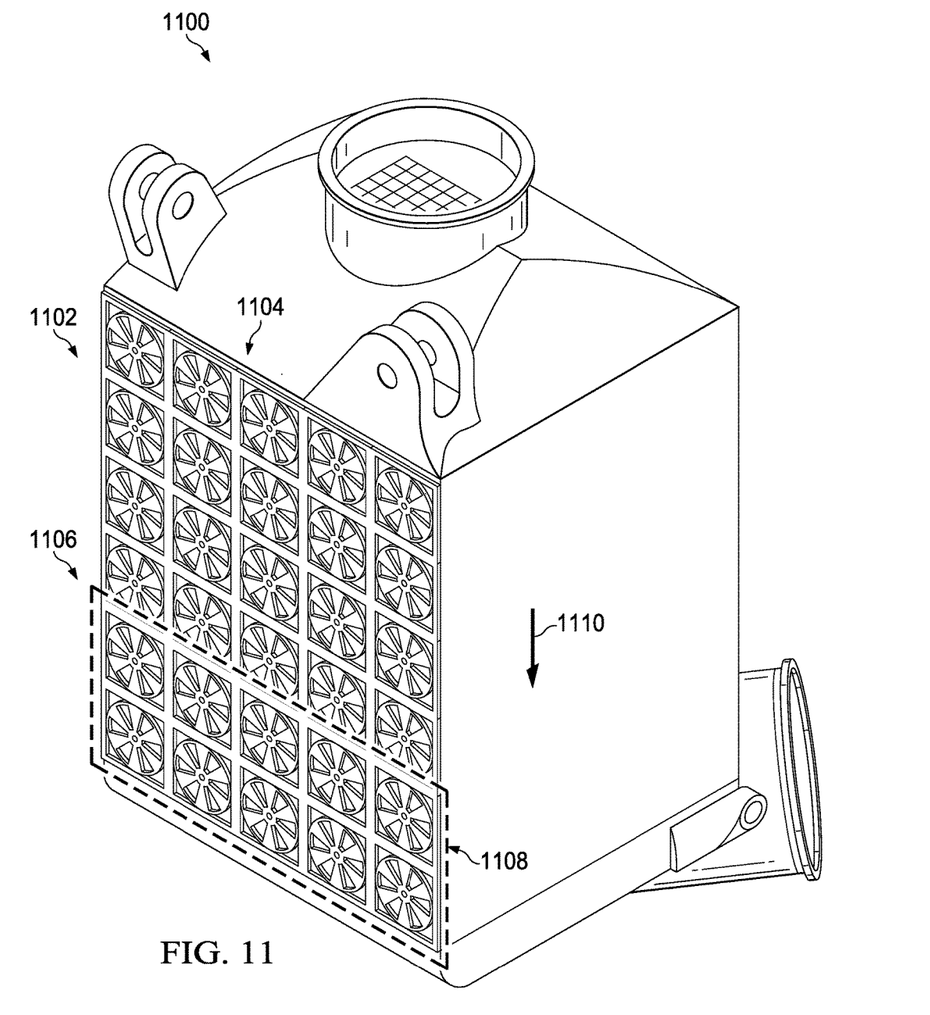
FIG. 11 is an illustration of an isometric view of a heat exchanger and an associated valve system with a plurality of valves in accordance with an illustrative embodiment.

Turning now to FIG. 11, an illustration of an isometric view of a heat exchanger and an associated valve system with a plurality of valves is depicted in accordance with an illustrative embodiment. Heat exchanger 1100 is a physical implementation of heat exchanger 240 of FIG. 2. Valve system 1102 is a physical implementation of valve system 206 of FIG. 2.

As depicted, valve system 1102 is associated with fan inlet 1104 of heat exchanger 1100. As depicted, valve system 1102 is directly connected to heat exchanger 1100. In some illustrative examples, valve system 1102 may be installed by sliding valve system 1102 into a retaining system of heat exchanger 1100.

An amount of air entering heat exchanger 1100 through fan inlet 1104 is controlled by actuating plurality of valves 1106 of valve system 1102. In some examples, air may be selectively introduced to only a portion of fan inlet 1104. For example, only a portion of plurality of valves 1106 may be actuated. In one illustrative example, only valves of plurality of valves 1106 within illustrative box 1108 may be actuated.

In other examples, air may be preferentially introduced to a portion of fan inlet 1104. For example, some valves of plurality of valves 1106 may be open a greater amount than other valves of plurality of valves 1106. In one illustrative example, openings of plurality of valves 1106 may be more open traveling in direction 1110.

Figure 12:
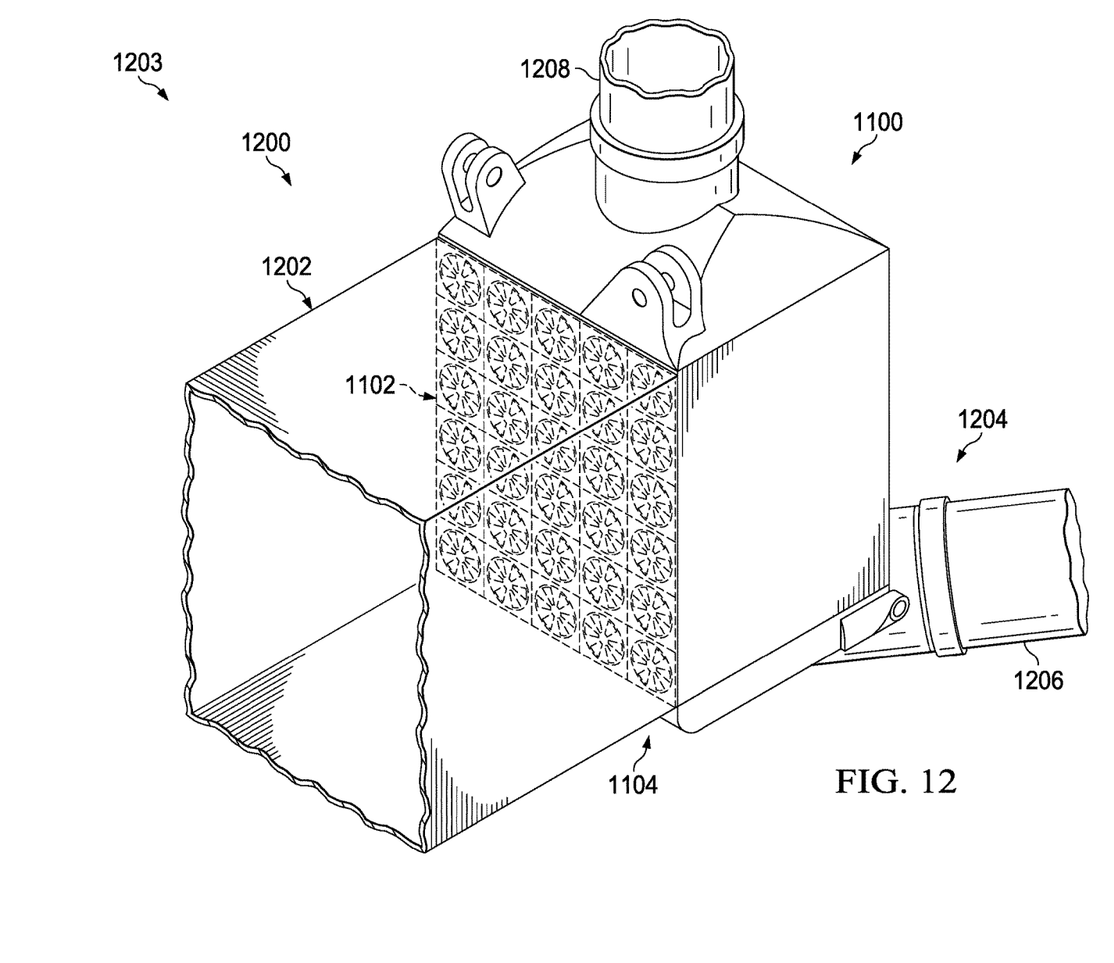
FIG. 12 is an illustration of a top view of a heat exchanging system in accordance with an illustrative embodiment.

Turning now to FIG. 12, an illustration of a top view of a heat exchanging system is depicted in accordance with an illustrative embodiment. Heat exchanging system 1200 is a physical implementation of heat exchanging system 238 of FIG. 2.

Heat exchanging system 1200 includes heat exchanger 1100 and valve system 1102 of FIG. 11. Heat exchanging system 1200 also includes ductwork 1202. As depicted, the cross-sectional shape of ductwork 1202 is substantially the same throughout the length of ductwork 1202. Further, the cross-sectional shape of ductwork 1202 is substantially the same as the cross-sectional shape of fan inlet 1104. In view 1203, fan inlet 1104, fan outlet 1204, bleed air inlet 1206, and bleed air outlet 1208 of heat exchanger 1100 are all visible.

Figure 13:
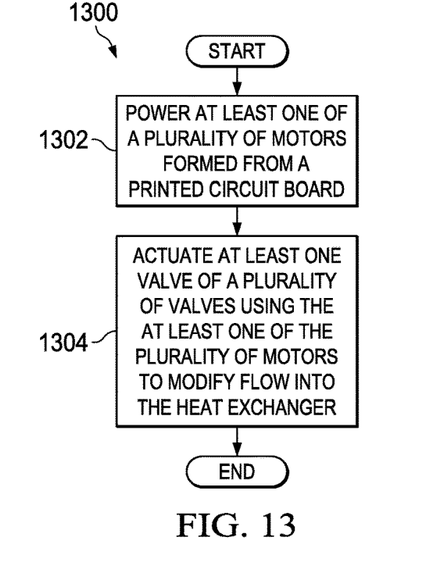
FIG. 13 is an illustration of a flowchart of a method for distributing flow into a heat exchanger in accordance with an illustrative embodiment.

Turning now to FIG. 13, an illustration of a flowchart of a method of distributing flow into a heat exchanger is depicted in accordance with an illustrative embodiment. Method 1300 may be a method of distributing flow into heat exchanger 240 of FIG. 2.

Method 1300 powers at least one of a plurality of motors formed from a printed circuit board (operation 1302). In some illustrative examples, the plurality of motors is a matrix of piezoelectric motors on a printed circuit board.

Method 1300 actuates at least one valve of a plurality of valves using the at least one of the plurality of motors to modify flow into the heat exchanger (operation 1304). Afterwards the method terminates.

Each valve of the plurality of valves is associated with a respective motor of the plurality of motors. In some examples, each motor of the plurality of motors is associated with only one valve. In other examples, each motor of the plurality of motors is associated with more than one valve.

In some illustrative examples, each of the plurality of valves is concentric with a respective motor of the plurality of motors. In some illustrative examples, a plurality of gears connects the plurality of motors and the plurality of valves, wherein actuating the at least one valve of the plurality of valves comprises turning at least one gear of the plurality of gears to actuate the at least one valve of the plurality of valves.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, method 1300 may further comprise reducing thermal stresses of the heat exchanger by actuating only a fraction of the plurality of valves. In another example, method 1300 further comprises sliding a valve system comprising the plurality of motors and the plurality of valves onto a face of the heat exchanger.

Figure 14:
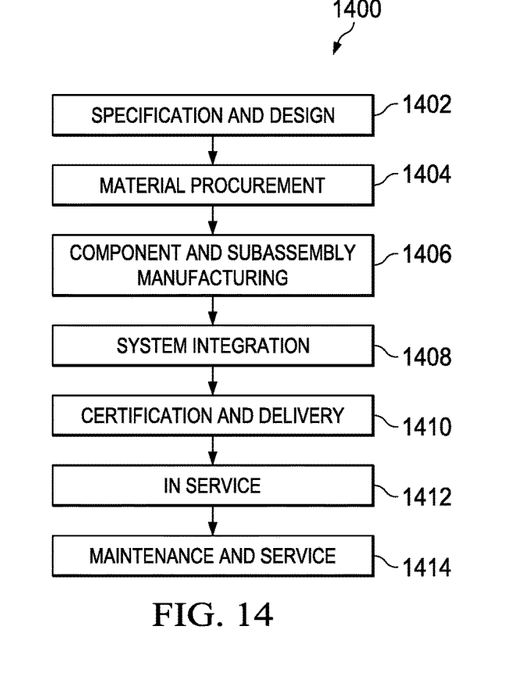
FIG. 14 is an illustration of an aircraft manufacturing and service method in the form of a block diagram in accordance with an illustrative embodiment.
Figure 15:
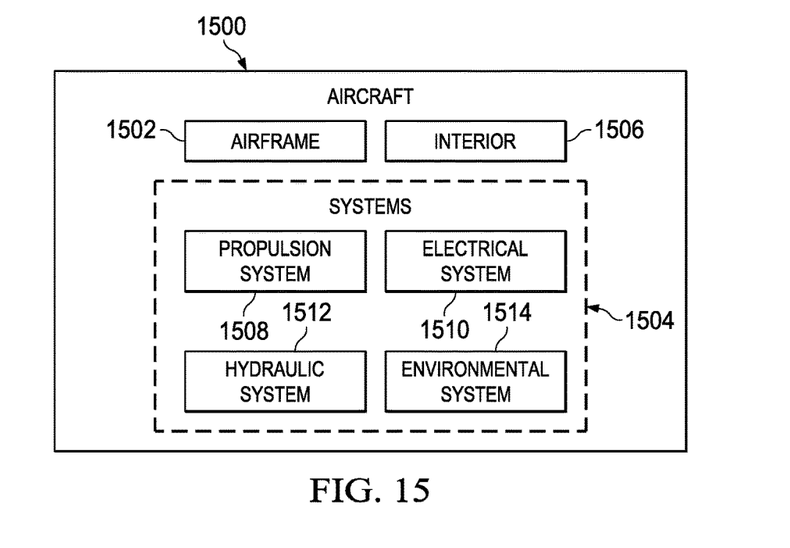
FIG. 15 is an illustration of an aircraft in the form of a block diagram in which an illustrative embodiment may be implemented.

Illustrative embodiments of the present disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 takes place. Thereafter, aircraft 1500 may go through certification and delivery 1410 in order to be placed in service 1412. While in service 1412 by a customer, aircraft 1500 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400. One or more illustrative embodiments may be used during component and subassembly manufacturing 1406 of FIG. 14. For example, valve system 206 of FIG. 2 may be installed within aircraft 204 during component and subassembly manufacturing 1406. Further, valve system 206 of FIG. 2 may be installed as a replacement part during maintenance and service 1414 of FIG. 14.

The illustrative examples provide a valve system having a plurality of motors and a plurality of valves. The valve system may be manufactured for a lower cost than conventional valves. Printing motors on printed circuit boards may be a lower cost process than machining a conventional valve. Further, the valve system may have a lower weight than a conventional valve.

By having a plurality of valves, the valve system has built-in redundancy. If a motor of the plurality of motors stops functioning, multiple motors remain functional.

By having a plurality of valves, only selected valves may be actuated. By actuating selected valves, fluid flow may be more precisely controlled.

Using the valve system with a heat exchanger on an aircraft may reduce maintenance time. For example, sliding in a valve system having a plurality of valves takes less time than unfastening a traditional valve from ductwork. Further, on an aircraft, the valve system may tolerate ice better than a traditional valve. By having multiple smaller valves, more torque may be present on smaller iced elements. Further, by having multiple smaller valves, some valves may be iced and valve system will remain functional.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A valve system comprising:
   a plurality of motors formed from a printed circuit board; and
   a plurality of valves actuated by the plurality of motors, wherein the plurality of motors is a plurality of hollow piezoelectric motors.

2. The valve system of claim 1, wherein a respective central axis of each valve of the plurality of valves is the same as a respective central axis of a motor of the plurality of motors.

3. The valve system of claim 2, wherein the plurality of valves comprises a plurality of iris valves.

4. The valve system of claim 2, wherein the plurality of valves comprises a plurality of rotor valves.

5. The valve system of claim 1, wherein the plurality of motors is arranged in an array configuration.

6. The valve system of claim 1 further comprising:
   a plurality of gears, each connecting a respective motor of the plurality of motors to a respective valve of the plurality of valves.

7. The valve system of claim 1 further comprising:
   a printed circuit board support; and
   a plurality of vibration dampers.

8. The valve system of claim 1, wherein the plurality of valves is coplanar.

9. The valve system of claim 1, wherein the valves are configured such that actuating at least one valve of a plurality of valves using the at least one of the plurality of motors modifies flow into a heat exchanger.

10. A heat exchanging system comprising:
    a heat exchanger having a fan inlet; and
    a valve system associated with the fan inlet, the valve system comprising a plurality of valves actuated by a plurality of motors formed from a printed circuit board, wherein the plurality of valves is coplanar, and wherein the plurality of motors is a plurality of hollow piezoelectric motors.

11. The heat exchanging system of claim 10, wherein the plurality of valves comprises at least one of a plurality of iris valves or a plurality of rotor valves.

12. The heat exchanging system of claim 10, wherein each of the plurality of valves is concentric with a respective motor of the plurality of motors.

13. The heat exchanging system of claim 10 further comprising:
    a plurality of gears, each connecting a respective motor of the plurality of motors to a respective valve of the plurality of valves.

14. The heat exchanging system of claim 10 further comprising:
    a printed circuit board support; and
    a plurality of vibration dampers.

15. A method of distributing flow into a heat exchanger:
    powering at least one of a plurality of motors formed from a printed circuit board; and
    actuating at least one valve of a plurality of valves using the at least one of the plurality of motors to modify flow into the heat exchanger.

16. The method of claim 15, wherein a plurality of gears connects the plurality of motors and the plurality of valves wherein actuating the at least one valve of the plurality of valves comprises turning at least one gear of the plurality of gears to actuate the at least one valve of the plurality of valves.

17. The method of claim 15 further comprising:
    reducing thermal stresses of the heat exchanger by actuating only a fraction of the plurality of valves.

18. The method of claim 15 further comprising:
    sliding a valve system comprising the plurality of motors and the plurality of valves onto a face of the heat exchanger.

19. The method of claim 15, wherein each of the plurality of valves is concentric with a respective motor of the plurality of motors.

* * * * *